United States Patent
French et al.

[15] 3,695,102
[45] Oct. 3, 1972

[54] SLIDABLE PIN-LOCKING TOOL

[72] Inventors: Elbert E. French, 3400 S. 4th Ave., Space 38, Yuma, Ariz. 85364; Robert W. Parker, 480 W. B. St., Brawley, Calif. 92227

[22] Filed: Nov. 30, 1970

[21] Appl. No.: 93,760

[52] U.S. Cl. .............................................. 73/141 R
[51] Int. Cl. ................................................. G01l 1/26
[58] Field of Search ........ 73/9, 89, 95, 141 R, 141 A, 73/141 AB, 133; 244/142, 149

[56] References Cited

UNITED STATES PATENTS

| | | |
|---|---|---|
| 1,103,131 | 7/1914 | De Grandpre............73/144 X |
| 2,493,782 | 1/1950 | Schwarz..........................73/9 |
| 2,593,269 | 4/1952 | Clifford et al........73/141 R X |
| 3,344,653 | 10/1967 | Benner..................73/141 A X |
| 3,485,092 | 12/1969 | Benner..............73/141 AB X |

*Primary Examiner*—Charles A. Ruehl
*Attorney*—R. S. Sciascia, George J. Rubens and J. W. McLaren

[57] ABSTRACT

A tool particularly suitable for testing the maximum pull force on a parachute rip cord pin connector, the tool being capable of detachably fitting on the connection to enable only partial withdrawal of the pin without complete separation of the connection that would deploy the parachute.

3 Claims, 2 Drawing Figures

PATENTED OCT 3 1972  3,695,102

INVENTORS
ELBERT E. FRENCH
ROBERT W. PARKER

BY

George J. Rubens

SLIDABLE PIN-LOCKING TOOL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to tools, and more particularly to a detachable tool that permits only partial separation of a connector to enable the separating pull force to be determined.

In the periodic testing and inspection of personnel-type parachutes one of the routine requirements is to subject the parachute pack to a rip cord pull test. Navy directives prescribe a maximum allowable pull force of 27 pounds, being the force needed to separate the rip cord pin from its respective locking cone through which the pin extends to lock the parachute in a packed condition. If this maximum required pull force is exceeded, the connector parts must be inspected to correct the malfunctioning.

In the past the two methods set forth in U.S. Navy standards for conducting such rip cord pull tests were conveniently performed at the same time the parachute was unpacked for its periodically scheduled general inspection, since both rip cord tests cause the connector parts to be completely separated to actuate the parachute which requires repacking.

Unfortunately, it has been observed that parachutes develop excess rip cord pull forces at times between routine service inspections giving rise to the need for a rip cord pull test that will not necessitate the activation and repacking of the parachute pack unless required because the parachute fails the test.

SUMMARY OF THE INVENTION

The invention tool enables the testing of the maximum pull force of a pin-type connector without the need to completely separate the connector parts, and is particularly suitable for conducting such tests on rip cord pin connectors. The tool is detachably mounted on the assembled rip cord connection and permits sufficient movement between the rip cord pin and its female connector counterpart to measure the maximum pull force required to initially move the pin without causing complete separation.

OBJECTS OF THE INVENTION

A principal object of this invention is to provide a locking tool that can be detachably mounted on an assembled pin-type connector to measure the maximum pull force required to separate the connector halves without complete disconnection thereof.

Still other important objects are to provide such a tool that when applied to a parachute rip cord pin connection does not cause the parachute to be deployed requiring repacking; and to provide a locking tool that will simplify and expedite the testing of pin-type connections.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
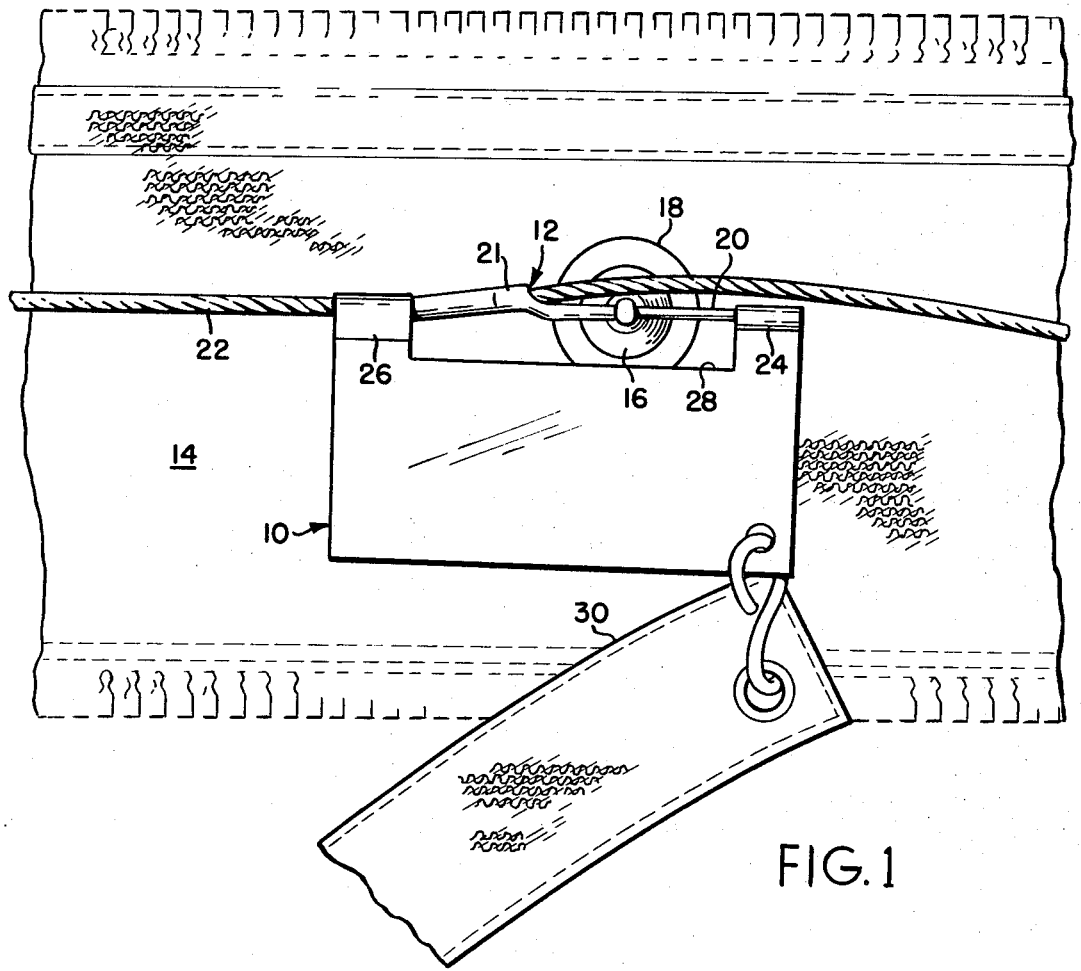
FIG. 1 is an enlarged plan view of the invention tool shown attached in locking position on the rip cord pin connection of a personnel type parachute pack.
Figure 2:
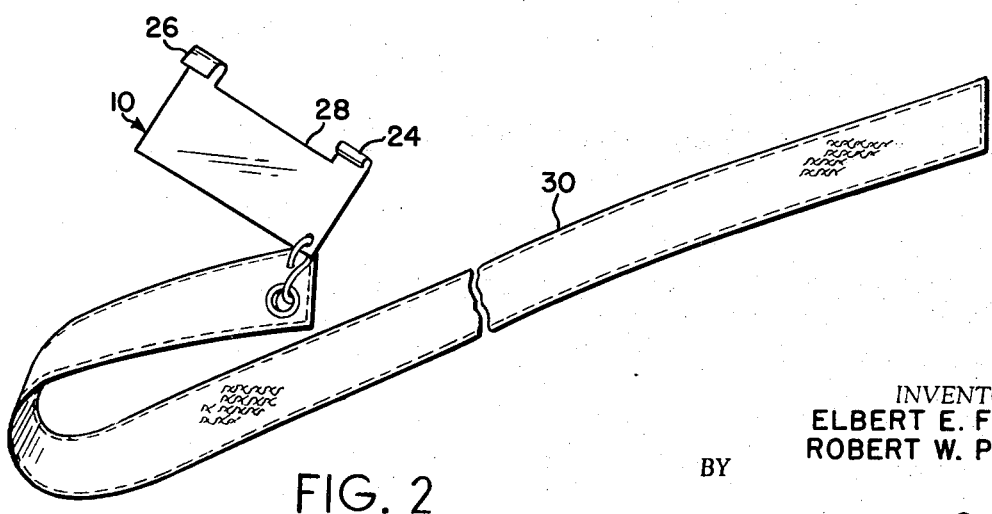
FIG. 2 is a perspective view of the tool and attached strap.

Referring to the drawing where like reference numerals refer to similar parts throughout the figures, there is shown in FIG. 1 a pin-stop tool 10 of this invention attached in a locking position to a rip cord pin connection 12 of a personnel-type parachute 14, a back portion thereof being illustrated. FIG. 1 illustrates only one of several releasable rip cord connections that may be used in a personnel type parachute to maintain the parachutes in a packed condition. Rip cord connection 12 is of standard configuration, and includes a locking cone 16 sewn or otherwise attached to one flap portion of the parachute container and adapted to extend through a grommet 18 attached to another flap portion of the parachute container. A tapered rip cord pin 20 slidably projects through an opening in cone 16 to lock the flaps of the parachute container together with the parachute in a compressed condition. Rip cord pin 20 is tapered at the free end to facilitate removal and is swaged at the other end 21 to a rip cord 22 having a handle (not shown) conveniently located in the front of the parachute pack for ready access to the user. Although the pin-stop tool can be used to test the maximum pull force on any slidable pin connection it is particularly suitable for use in a parachute rip cord pin connection as illustrated. U. S. Navy Regulations require that prescribed periodic pull test inspections be conducted on personnel type parachutes to determine whether the pull force on the rip cord handle exceeds a maximum allowable force of 27 pounds. It is apparent that excessive rip cord pull could jeopardize the lives of personnel using the parachute in an emergency. If the maximum allowable pull force is exceeded, the various components of the connection, i.e., rip cord pins, locking cones and grommets are inspected for bends, dents and roughness and the damaged parts repaired or replaced.

There are two standard U. S. Navy procedures for testing the rip cord connection for maximum pull force. One method employs a spring scale which is attached to the rip cord handle. A steady, straight pull is exerted on the rip cord until the pin is completely removed from the locking cone. Another similar method employed a 27 pound weight attached to the rip cord handle. In both test procedures, the rip cord pin 20 is completely withdrawn from its respective locking cone 16 causing the parachute to be deployed and requiring repacking. For this reason rip cord pull tests are usually conducted when the parachute is returned to the parachute packing loft for its scheduled repack cycle, which may be every 126, 147 or 182 days depending upon the type of assembly.

However, because of reports of excess rip cord pull forces found to exist between scheduled repacks, there is a need to provide more suitable means for conducting these tests between repack cycles without requiring repacking of the parachutes. During an investigation of the probable causes of high rip cord forces it was discovered that the force required to initially move the rip cord pin, i.e., ½ inch movement, provided a valid indication of the maximum force necessary to pull the rip cord pin.

As a consequence, rip cord pin-stop tool 10 was designed to be detachably mounted to the rip cord pin connection to enable the pull force to be measured by only a limited movement of the rip cord pin without requiring a complete separation of the connection. Obviously, such a device enables the test to be conducted in a location other than a parachute repacking loft and in a minimum of time avoiding the need for repacking the parachute if the parachute tests satisfactorily.

Pin stop tool 10 comprises a blank, preferably made of corrosion resilient steel, stamped, or otherwise formed, with two spaced projections one at each end. One projection is bent over to form an eye 24, and the other projection is bent over to form a clip 26 with a recessed intermediate portion 28. A strip 30 of red colored bunting of 4 foot length is connected to tool 10 by an S-shaped link. The function of strip 30 is as a flagging means to warn the parachute checker that the tool 10 is in an installed position and avoid its remaining installed on the rip cord pin after completion of the test which will cause the parachute to be inoperable. The 4 foot length of the strip will insure that it will extend beyond the parachute pack and be visible. When it is desired to test the pull force on an assembled pin connection, the tool 10 is installed by first inserting rip cord pin 20 in eye 24. Clip 26 is then hooked over the rip cord adjacent the swaged end 21 of pin 21 to complete the installation of the tool. The throat dimension of clip 26 is smaller than the diameter of swaged end 21 of the rip cord pin to abut therewith and restrict separation. Recessed portion 28 of the tool provides space to accommodate the pin-cone connection. With the tool thus installed, a test pull on rip cord 22 will allow pin 20 to be partly backed out of cone 16 until the swaged end of rip cord pin 21 abuts clip 26 to restrict further relative movement, this condition being illustrated in FIG. 1. Thereafter, the rip cord pin and tool are locked together with the free end of pin 21 remaining captured in eye 24. In one model of the tool constructed with a recessed portion of 2 inches in length, when installed on the pin-cone connection, pin 20 can be withdrawn one-half inch before its movement is stopped by eye 24 engaging locking cone 16. It has been found that this small initial movement affords a sufficient test of the pull force on the pin connection to satisfy accepted Navy standards. Upon test completion, tool 10 is unclipped at 26 and eye 24 is pulled off tapered pin 21. Strip 30 will project beyond the parachute pack to warn the checker to remove the tool.

The novel tool provides a simple and expedient device for use in standard U. S. Navy test procedures for testing the pull force on rip cord pin connections without limiting the testing to periodic parachute repack cycles, nor at parachute loft facilities, since the parachute is not activated during such tests. Thus, providing such a test tool will enable the pull test to be conducted more frequently and without limitation as to locality whenever there is reason to justify such test. This flexiblity will minimize the hazards due to faulty parachutes.

Obviously many modifications and variations of the present invention are possible in the light of the above teachings. It is therefore to be understood that within the scope of the appended claims the invention may be practiced otherwise than as specifically described.

What is claimed is:

1. A locking tool for testing the maximum pull force on an assembled parachute rip cord connector comprising a rip cord cable having a pin slidably engaging a female member comprising:

a body portion having an eye portion adapted to receive a free end of the rip cord pin; said body portion also having a clip portion located in spaced relation to the eye portion and adapted to slide over the rip cord cable and abut the end of the pin attached to the cable;

whereby the tool can be temporarily attached to the pin to permit initial partial withdrawal movement of the pin from the female member while preventing complete separation thereof to enable the maximum pull force on the rip cord cable to be measured.

2. The locking tool of claim 1 wherein said body portion is fabricated of sheet material and said eye portion and said clip portion integrally project in spaced relation from the body portion on one side forming a recess therebetween to accommodate the connector.

3. The locking tool of claim 2 wherein a flagging device is attached to the tool capable of projecting beyond the parachute pack to warn of the presence of the tool.

* * * * *